United States Patent [19]

Brendel

[11] 4,396,079
[45] Aug. 2, 1983

[54] WEIGHING SYSTEM

[75] Inventor: Albert E. Brendel, Lake Orion, Mich.

[73] Assignee: Sensor Developments, Inc., Lake Orion, Mich.

[21] Appl. No.: 288,093

[22] Filed: Jul. 29, 1981

[51] Int. Cl.³ .................... G01G 21/02; G01G 21/28; G01G 23/02; G01G 3/4

[52] U.S. Cl. .................................. 177/179; 177/180; 177/154; 177/211

[58] Field of Search .............. 177/179, 180, 211, 244, 177/154

[56] References Cited

U.S. PATENT DOCUMENTS

| | | | |
|---|---|---|---|
| 4,285,412 | 8/1981 | Wirth | 177/179 |
| 4,300,645 | 11/1981 | Sly et al. | 177/211 |
| 4,307,787 | 12/1981 | Raboud et al. | 177/211 X |

Primary Examiner—George H. Miller, Jr.
Attorney, Agent, or Firm—Cullen, Sloman, Cantor, Grauer, Scott & Rutherford

[57] ABSTRACT

A low profile scale utilizes four strain gage-based sensing beams which are isolated from mechanically or thermally-induced distortions on the weighing platform by means of interposed elastic elements. The platform is capable of moving upwardly relative to the sensing elements without transmitting any load thereto. The platform cooperates with a floating lower enclosure system to essentially seal the mechanism so that it is splash proof and washable as required for use in the food industry. Adjustable overload stops channel excess forces around the sensing beams to protect them from damage.

4 Claims, 4 Drawing Figures

WEIGHING SYSTEM

BACKGROUND AND SUMMARY OF INVENTION

Strain gage-based platform scales may employ a single sensor in conjunction with force-redirecting structure to isolate the sensor from extraneous loads and compensate for loads which are applied off-center, or they may employ multiple sensing elements. One type of low profile multiple sensing beam platform scale is disclosed in U.S. Pat. No. 4,261,429.

The use of multiple sensors permits the system to be designed for minimum height, which is advantageous in weighing applications on existing counter tops which are designed at a height for maximum convenience. One such application is in the food service industry, where individual ingredient portions must be frequently and accurately weighed. Such application also requires that the unit be splash proof and washable, to maintain sanitation and scale accuracy. The weighing of products which may be substantially above or below room temperature introduces the possibility of thermal distortions of the platform, which must be minimized to maintain scale accuracy.

Furthermore, in applications such as the food service industry, where the capacity of the scale is relatively low but the required degree of accuracy is relatively high, it is important to protect the sensing mechanism from extraneously directed loads or excessive loads. These extraneous loads include those applied upwardly to the platform, such as when the scale is lifted.

Finally, it is desirable that the weighing system be designed so that the capacity or sensitivity of the system can be changed or damage repaired while retaining a maximum number of common components.

These objects have been achieved by the present invention. Protection of the sensing beams from lateral or upward forces is achieved by the use of a readily compressible resilient grommet or pad through which all downward and lateral loads are applied. One of such grommets is interposed between each of the sensing beams and the platform. The platform is maintained in proper lateral registry will the remaining structure by means of locating pins fixed to the underside of the platform and normally received in a central bore in each of the grommets. Thus, extraneous lateral forces are absorbed by the compressible grommet. Similarly, upward movement of the platform merely causes the locating pins to slide upwardly out of the grommet, there being no connection between the platform and the sensing beam under such loading conditions.

The full enclosure of the system is achieved by an assembly of the platform and a floating metallic lower enclosure plate secured to the platform. The lower enclosure plate has four openings through which each of the scale-supporting feet extend, but such openings are sealed by thin rubber diaphragms secured to the edges of each opening and to the feet. Such diaphragms are incapable of absorbing or transmitting any normally-encountered loads from the platform to the remaining structure, thereby assuring that all forces to be measured are transmitted from the platform through the resilient grommets to the sensing beams. One of the feet may be made hollow so that the electrical connections for the strain gages can enter the enclosed scale from below, without significantly compromising the washability or splash-proof features of the scale.

The thin sheet metal platform readily dissipates heat, and the lateral compressibility of the grommets aid in absorbing thermally-induced expansion or contraction of the platform.

Adjustably positioned overload stops are provided in the form of set screws in the frame which engage the underside of a sensing beam extension plate after the extension plate and sensing beam have been downwardly deflected by an applied load which exceeds a predetermined value. In this way, any further loads are safely by-passed around the sensing beam.

DETAILED DESCRIPTION OF THE DISCLOSURE

The weighing system of the present invention generally comprises a rigid frame plate 10 supported on four rubber feet 12 and a load-receiving sheet metal platform 14 the load on which is transmitted to and measured by four strain gage-equipped sensing beams 16.

Figure 2:
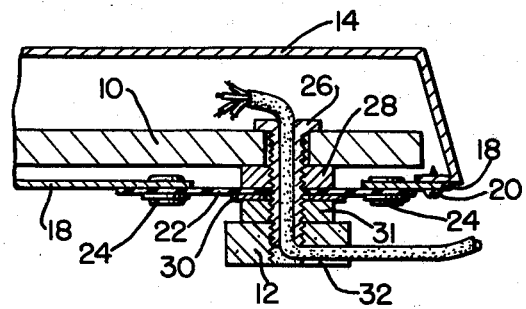
FIG. 2 is a fragmentary cross-sectional elevation in the direction of arrows 2—2 of FIG. 1.

The scale is fully enclosed on the top and sides by means of upper platform 14. The under side of the scale is similarly enclosed by supplementary structure which floats freely relative to the frame. This lower structure comprises a sheet metal lower enclosing plate 18 secured to inwardly turned flanges at the lower edges of platform 14 by means of sheet metal screws 20, as shown in FIG. 2. Plate 18 is provided with four holes to permit passage of feet 12, each of such holes being spanned by a thin flexible rubber diaphragm 22 adhesively bonded or secured to the plate by rivets 24. Diaphragms 22 have a small central opening to receive the lower end of flanged nipple 26 which passes downwardly through a clearance hole in frame plate 10 and is secured thereto by nut 28. Diaphragm 22 is sandwiched or clamped between nut 28 and washer 30 and nut 31. Suitable sealants and/or gaskets may be applied to the joints of plate 18 to platform 14 and to diaphragms 22. Rubber foot 12 can be cemented to nut 31 or to the extended portion of nipple 26.

As shown in FIG. 2, one of the rubber feet 12 can be provided with an exit slot 32 so that the wiring from the strain gages on each of the four sensing beams 16 can be routed downwardly through one of the hollow-bored nipples 26 and out through slot 32 in the foot. Once the wiring is in place, the slot surrounding the wiring can be filled with a suitable sealant. In this way, the interior of the scale is maintained in a substantially completely sealed condition, the only opening being that which exists in this small slot in one of the rubber feet. While the scale is not immersion proof, it is splash proof and can be washed without danger of the interior becoming wet. Furthermore, the wires will not impose any drag or resistance to movement of the platform as could occur if the wires exited through the movable enclosing elements.

Figure 1:
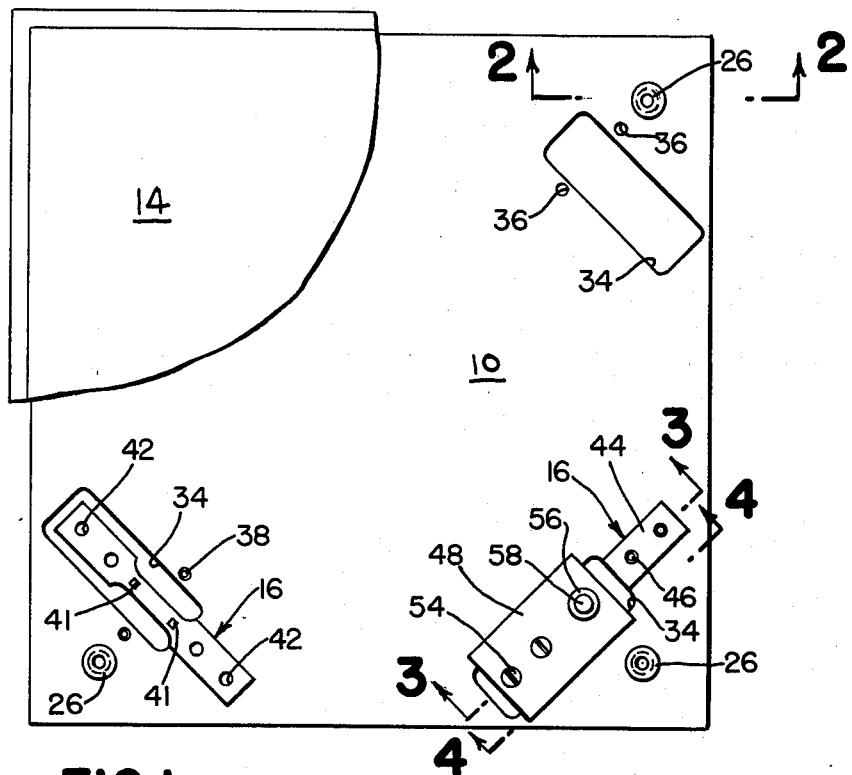
FIG. 1 is a plan view of the weighing system of the present invention, with the upper platform partially broken away and with two of the four sensing beam stations illustrated in various degrees of incompleteness to reveal additional structural details.
Figure 3:
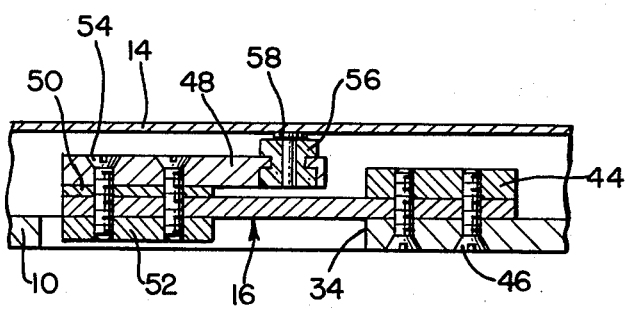
FIG. 3 is a fragmentary cross-sectional elevation viewed in the direction of arrows 3—3 of FIG. 1.

As best shown in FIGS. 1 and 3, frame plate 10 is provided with four clearance holes 34 which provide room for sensing beams 16 to deflect downwardly under load without interference with the frame. Each sensing beam station is further provided with two threaded holes 36 to receive set screws 38 which function as overload stops in a manner to be described below.

Each of the sensing beams 16 is provided with a narrowed central gaging portion 40 to which strain gages 41 are bonded in conventional fashion. The outer ends of each sensing beam are provided with mounting holes 42. At one end of the beam, mounting holes 42 are used in conjunction with back-up plate 44 and screws 46 to secure sensing beam 16 to frame plate 10 in cantilevered fashion. It will be noted that the sensing beam station in the lower left portion of FIG. 1 is illustrated with back-up plate 44 and other supplementary structure removed to reveal additional structural details.

At the free or floating end of sensing beam 16 there is mounted beam extension plate 48 and interposed spacer 50, these elements being secured to beam 16 by means of the lower back-up plate 52 and screws 54. Beam extension plate 48 extends over the mid-point of sensing beam 16, at which point is secured rubber pad or grommet 56. Grommet 56 is provided with a central bore which receives the lower portion of locating pin 58 which is brazed or welded to the underside of platform 14. Pin 58 is dimensioned to freely move vertically within grommet 56 so that platform 14 can move upwardly without applying any load to sensing beam 16. It will be appreciated that the pin and grommet combination function as a lateral locating means for maintaining proper registry of platform 14 relative to frame 10, notwithstanding the absence of any rigid direct connection between the platform 14 and frame 10. Furthermore, the compressibility of grommet 56 permits moderate lateral and vertical impact loads on the platform to be gently absorbed without excessive application of forces to sensing beam 16. However, all loads to be measured will, when placed on platform 14, transmit their gravity-induced downward forces through the head of locating pin 58 to grommet 56, beam extension plate 48 and spacer 50 to the free end of sensing beam 16.

Figure 4:
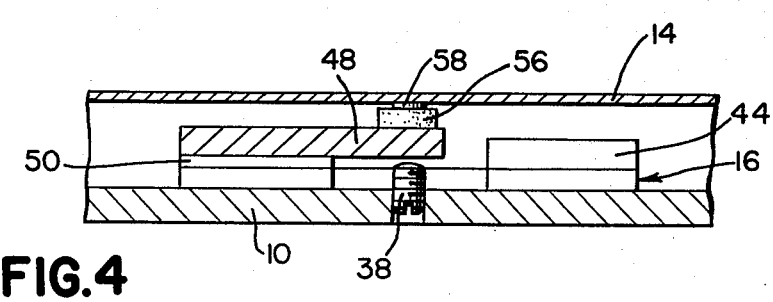
FIG. 4 is a fragmentary cross-sectional elevation viewed in the direction of arrows 4—4 of FIG. 1.

As best shown in FIGS. 1 and 4, beam extension plate 48 also extends in a lateral direction a sufficient distance to overlap set screws 38. Therefore, any excessive downward forces beyond a predetermined load (as determined by the vertical setting of screws 38) will cause beam extension plate 48 to bottom out against screws 38, whereupon any further loads are transmitted directly to frame plate 10 and do not further load sensing beam 16. The set screws are preferably located along the perpendicular bisector of the sensing beam, i.e., along a line perpendicular to the mid point between strain gages 41, to prevent any additional bending moments from being applied to beam 16 during an overload condition.

Because sensing beams 16 are separately fabricated from frame plate 10, the capacity or sensitivity of the weighing system of the present invention can be modified for other applications by utilizing a stiffer or more yieldable sensing beam, while retaining all other components of the system.

The location of rubber diaphragms 22 beneath the scale and inwardly from the scale edges provides maximum protection for these delicate parts, thereby helping to assure that the unit will remain spash proof and washable.

The strain gages are wired into a wheatstone bridge circuit in conventional fashion, as will be understood by those skilled in the art. The sensitivities of the four sensing beams are preferably matched so that the scale will not be sensitive to load position. Each of the sensing beams is preferably sized so that it is capable of carrying the full design load if the load is applied directly over one of such sensors.

A proposed commercial embodiment of the present invention, rated for 200 ounce loads, has an overall height 1¼ inches and a platform which is nine inches by nine inches square.

This invention may be further developed within the scope of the following claims. Accordingly, the above specification is to be interpreted as illustrative of only a single operative embodiment of the present invention, rather than in a strictly limited sense.

I now claim:

1. In a strain gage-based weighing system comprising a rigid frame, a platform yieldably mounted relative to the frame and adapted to receive on its upper surface the load to be weighed, a sensing beam having a first end rigidly secured to said frame and a second end free to move relative to said frame in response to a load applied to such second end, said sensing beam being resiliently bendable in proportional response to the weight of the load to be weighed, said sensing beam having strain gages secured thereto for generating a signal responsive to the weight of the load, the improved means for transmitting the weight of the load from the platform to the sensing beam comprising:

resilient pad means located between the underside of said platform and said free end of said sensing beam, said platform normally resting upon and being supported solely by said pad means, and said pad means in turn transmitting all downward loads applied thereto to said free end of said sensing beam, said pad means being readily compressible within the range of loads to be measured so as to absorb downward impacts applied to the platform, and said pad means having an upwardly opening bore adapted to freely receive downwardly extending locating pin means secured to the underside of said platform, whereby said platform can be lifted relative to said sensing beam without applying any significant load to said sensing beam, and whereby said bore functions to locate and guide said locating pin means and said platform into the desired lateral position relative to said sensing beam.

2. The weighing system of claim 1 wherein said frame is a low profile horizontal planar plate having said first end of said sensing beam secured to the upper surface thereof with the remaining portion of said sensing beam being cantilevered over a cut-out portion of said plate to permit said free end of said sensing beam to downwardly yield into said cut-out in response to a load to be weighed, said weighing system further comprising a rigid beam extension plate secured to the upper side of said free end of said sensing beam, said plate extending parallel to and above said sensing beam to a point above the mid-point of said sensing beam at which point said resilient pad means is secured to said extension plate, said extension plate also extending horizontally in a direction perpendicular to the length of said sensing beam a sufficient distance to project vertically above portions of said frame plate adjacent to said plate cut-out, said adjacent plate portions having vertically adjustable projections extending upwardly to be selectively engaged by the underside of said extension plate after a predetermined amount of downward travel of said extension plate in response to an overload condition, thereby to route excessive downward loads directly from said extension plate to said projections and frame plate by-passing and protecting said sensing beam from such overload.

3. In a strain gage-based weighing system comprising a rigid frame, a platform yieldably mounted relative to the frame and adapted to receive on its upper surface the load to be weighed, a sensing beam having a first end ridigly secured to said frame and a second end free to move relative to said frame in response to a load applied to such second end, said sensing beam being resiliently bendable in proportional response to the weight of the load to be weighed, said sensing beam having strain gages secured thereto for generating a signal responsive to the weight of the load, the improvement which comprises:

said frame being a low profile horizontal planar plate having said first end of said sensing beam secured to the upper surface thereof with the remaining portion of said sensing beam being cantilevered over a cut-out portion of said plate to permit said free end of said sensing beam to downwardly yield into said cut-out in response to a load to be weighed, said weighing system further comprising a rigid beam extension plate secured to the upper side of said free end of said sensing beam, said plate extending parallel to and above said sensing beam to a point above the mid-point of said sensing beam, means for transmitting the weight of the load to be weighed from the platform to said extension plate at said point above the mid-point of said sensing beam;

said extension plate also extending horizontally in a direction perpendicular to the length of said sensing beam a sufficient distance to project vertically above portions of said frame plate adjacent to said plate cut-out, said adjacent plate portions having vertically adjustable projections extending upwardly to be selectively engaged by the under side of said extension plate after a predetermined amount of downward travel of said extension plate in response to an overload condition, thereby to route excessive downward loads directly from said extension plate to said projections and frame plate, by-passing and protecting said sensing beam from such overload.

4. The weighing system of claim 3 wherein said platform is supported by a plurality of feet and said platform completely encloses the top and sides of said frame, the weight of said platform and of any load supported thereon being supported solely by the strain gage-based sensing system secured to said frame beneath the underside of said platform, a lower enclosing plate beneath said frame and extending outwardly to engage and fasten to the lower peripheral edges of said platform for vertical movement therewith, said lower enclosure plate having cut-out openings to clear the frame-supporting feet which project downwardly therethrough, each of said openings being spanned by a horizontally extending planar flexible diaphragm which is secured to and sealed to the edge of said opening and to the foot which extends through said opening and said diaphragm, said diaphragm being incapable of transmitting any vertical loads from said platform to said frame, said lower enclosure plate being otherwise free of any connection to said frame, whereby said lower enclosure plate and said diaphragms and said platform fully enclose and seal said weighing system.

* * * * *